US007404895B2

(12) United States Patent
Reynders

(10) Patent No.: US 7,404,895 B2
(45) Date of Patent: Jul. 29, 2008

(54) FILTER APPARATUS FOR SEPARATING PARTICLES FROM A LIQUID

(75) Inventor: Luc Reynders, Riemst (BE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 11/776,522

(22) Filed: Jul. 11, 2007

(65) Prior Publication Data
US 2008/0011665 A1    Jan. 17, 2008

(30) Foreign Application Priority Data
Jul. 11, 2006    (DE) .................. 20 2006 010 759 U

(51) Int. Cl.
*B01D 33/056*    (2006.01)
(52) U.S. Cl. .................. 210/297; 210/298; 210/387
(58) Field of Classification Search .......... 210/297, 210/298, 387
See application file for complete search history.

(56) References Cited
U.S. PATENT DOCUMENTS
3,087,620 A * 4/1963 Hirs ........................... 210/111
3,091,336 A * 5/1963 Hirs ........................... 210/111
4,250,036 A * 2/1981 Parshall ....................... 210/297
4,390,428 A * 6/1983 Bratten ........................ 210/400
5,601,729 A   2/1997 Bratten

* cited by examiner

*Primary Examiner*—Thomas M Lithgow
(74) *Attorney, Agent, or Firm*—Crowell & Moring LLP

(57) ABSTRACT

A filter apparatus for separating particles from a liquid having a tank with a feed inlet, a gravitational settling zone and a filtration zone arranged downstream of the settling zone. Inside the tank are two transversely spaced-apart endless chains with transversely extending drivers fixed between the chains, the drivers and chains together forming a conveying apparatus driven by gear wheels and a drive motor. The filtration zone includes a vacuum chamber, which is formed partly by the tank and is arranged underneath the solid particle filtration apparatus. Between the unfiltered liquid region and the filtered liquid region is a filter media strip, which is pulled through the tank along a path which changes direction by the chains and drivers. Each chain has flexible metal strips that extend along the chain and over a plurality of chain links. The metal strips are fixed at one end and partially overlap. These metal strips exert a force directed toward the filter media strip, which ensures that a seal is formed between the unfiltered liquid region and the filtered liquid region in the area where the moving filter media strip changes direction.

5 Claims, 3 Drawing Sheets

FILTER APPARATUS FOR SEPARATING PARTICLES FROM A LIQUID

BACKGROUND OF THE INVENTION

The present invention relates to a filter apparatus for separating particles from a liquid.

U.S. Pat. No. 5,601,729 discloses a filter apparatus for separating particles, dirt or chips from a liquid. This apparatus comprises a tank with a feed inlet, a gravitational settling zone and a filtration zone disposed downstream thereof. Two transversely spaced-apart, driven, endless chains extend within the tank and entrain a nonwoven filter web or a filter media strip. This nonwoven filter web or filter media strip completely covers a filtered liquid region of the device. The chains prevent the nonwoven filter web or media strip from lifting off the filtered liquid region and thereby prevent dirt from getting into the filtered liquid region. A drawback of these chains is that they cannot be designed as flat tracks but that the chain links are individual elements with a waisted shape that may have the result that dirt can pass into the filtered liquid region through the chain links.

To prevent the penetration of dirt around the filter media, the prior art proposes to dispose an inflatable tube seal in the critical sealing region to provide an additional lateral seal between the unfiltered liquid region and the filtered liquid region. If the filter media strip must be moved, this seal must be deflated, i.e., at least partly evacuated, so that the filter media strip can slide along underneath the seal. Especially when the filter media strip is moved, however, strong turbulence occurs in the region of the unfiltered liquid and with the result that dirt can be carried into the filtered liquid region. Thus, this prior art has the disadvantage that the lateral seal is only intermittently effective.

SUMMARY OF THE INVENTION

An object of the invention is to provide an improved filter apparatus for separating particles from a liquid.

Another object is to provide a filter apparatus in which a transportable filter media strip is reliably sealed at its lateral edges.

A further object is to provide a filter apparatus with a moveable filter media strip in which a reliable seal between an unfiltered liquid region and a filtered liquid region is achieved by a simple structure.

These and other objects are achieved in accordance with the present invention by providing a filter apparatus for separating particles from a liquid, comprising a tank with a feed inlet, a gravitational settling zone and a filtration zone disposed downstream thereof, wherein the tank is equipped with two transversely spaced-apart, driven, endless chains with transversely extending drivers are provided between the chains, the chains and drivers forming a conveying apparatus driven by gear wheels and a drive motor, and wherein the filter apparatus has a vacuum chamber formed partly by the tank and arranged underneath the filtration zone, and a filter media strip is disposed between an unfiltered liquid region and a filtered liquid region and is moved through the tank along a path which changes direction by conveying apparatus, wherein each chain or each driver has flexible metal strips provided thereon, the strips extending along the chain over a plurality of chain links, each the strip being fixed at one end and partially overlapping with a succeeding strip, the strips exerting a force directed toward the filter media strip which ensures formation of a seal between the filtered liquid region and the unfiltered liquid region in the area where the moving filter media strip changes direction.

In accordance with the invention, flexible metal strips are provided on the chains or on drivers disposed between the two endless chains. These metal strips partially overlap and exert a force directed toward the filter media strip, which ensures that a seal is formed between the filtered liquid region and the unfiltered liquid region. The metal strips are preferably resilient bands that adapt to the shape of the filter chamber.

According to one embodiment of the invention, in the region of the chain where the path of the chain changes direction, hold-down elements are provided on the chain wheels or gear wheels arranged in this region to exert a force on the metal strips in the direction of the filter media strip. These hold-down elements may be formed of pins supported longitudinally for movement in radial direction to compensate tolerances. These pins are biased by a compression spring in the direction of the metal strips.

In another embodiment of the invention, the metal strips are fixed to a surface of the drivers located between the chains, preferably to a surface that extends parallel to the filter media strip.

In a further embodiment, the metal strips have a length of approximately 600 mm to 1000 mm and a width of about 50 mm to 150 mm.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions, for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
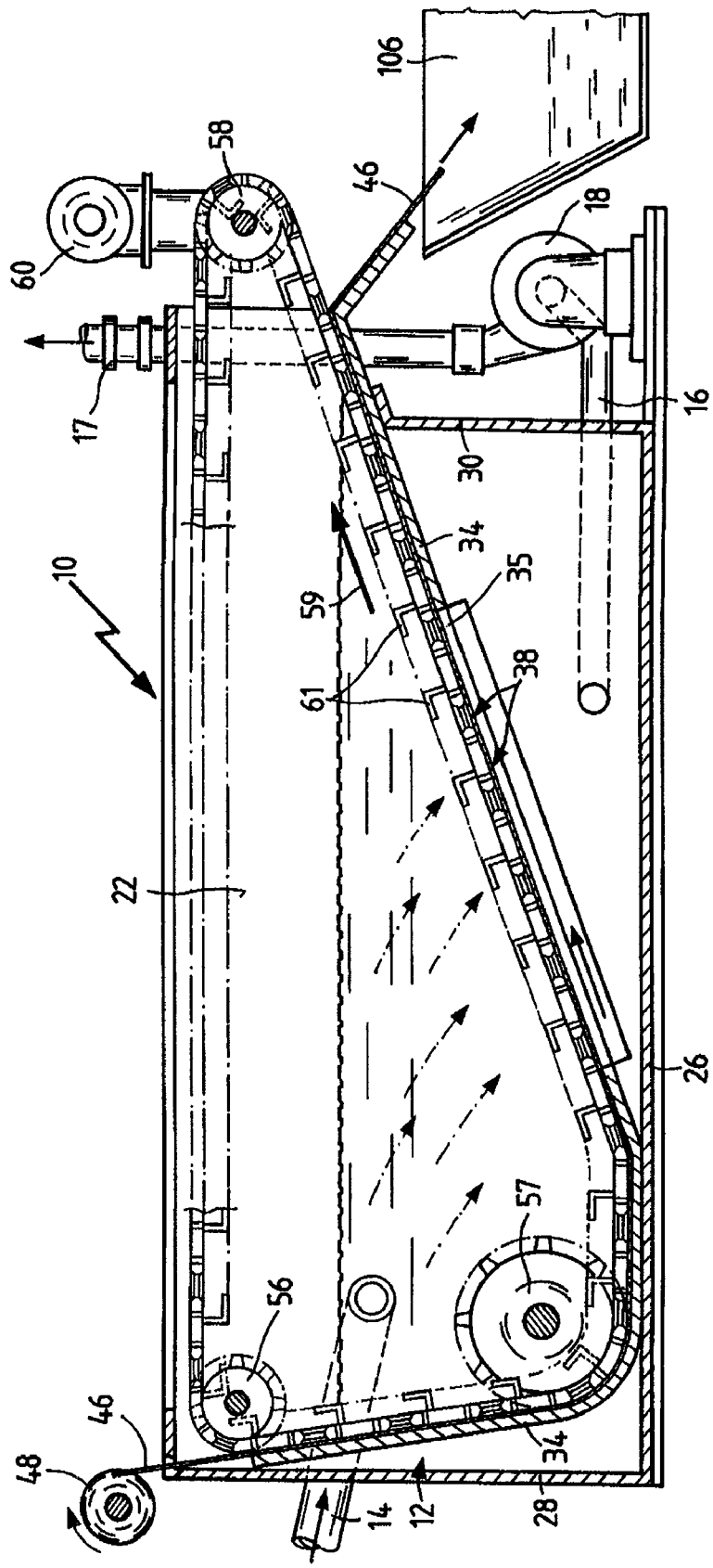
FIG. 1 is a sectional view of a filter apparatus according to the present invention.

FIG. 1 shows a filter apparatus 10 comprising a tank 12 with a feed inlet 14 for introducing liquid to be filtered and an outlet pipe 16 for discharging the filtered liquid. This outlet pipe is connected to distributor lines 17 via a pump 18. The tank 12 further has sidewalls 22, 28, 30 and a floor 26. Above the floor 26 is a partition 34, which is configured as a gap or slot filter in a region 35. Within the filter apparatus 10 is a circulating conveyer chain 38 formed of individual chain links and moved by gear wheels 56, 57 and 58. Whereas the gear wheels 56, 57 are idler gear wheels which co-rotate freely, the gear wheel 58 is driven by a drive motor 60.

Disposed between the partition 34 and the conveyor chain 38 is a strip of filter media 46, which extends from a supply roll 48 through the entire filter apparatus 10 and into tank 106. Dirt or particles contained in the liquid introduced into the tank through the feed inlet 14 settle on the filter media strip 46. They are removed from the liquid by the movement of the filter media strip in the direction of arrow 59 and are discharged with the filter media strip 46 into tank 106.

Figure 2:
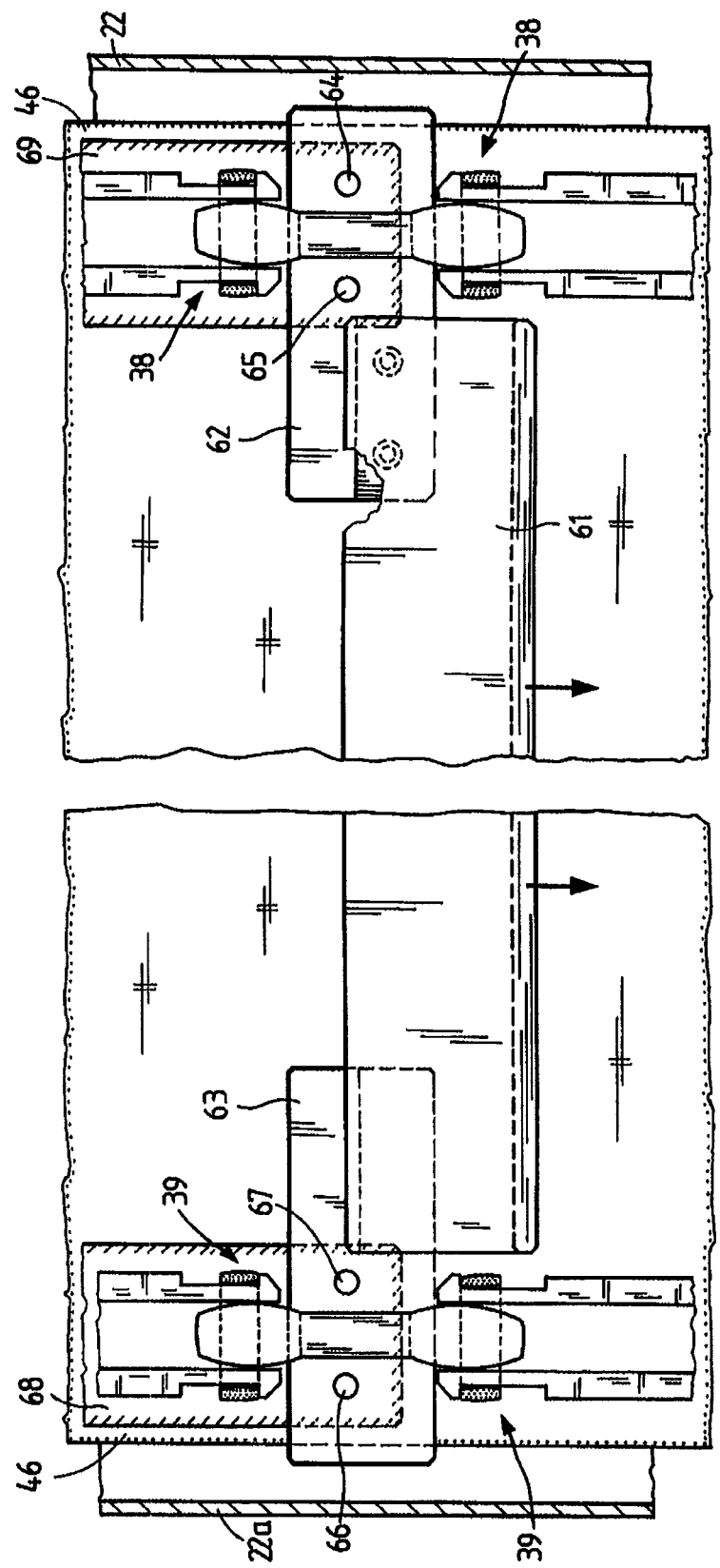
FIG. 2 is a top plan view of a filter media strip transported by chains.

The top view of FIG. 2 shows the filter media strip 46. The two conveyor chains 38 and 39 rest on this filter media strip. The filter media strip 46 occupies substantially the entire width between the two sidewalls 22 and 22*a*. Drivers 61 are disposed between the conveyor chains 38 and 39. One driver 61 is visible in the view of FIG. 2. The function of the drivers is to transport the dirt settling on the filter media strip 46 out of the liquid region and to prevent dirt from sliding off the filter medium. The drivers 61 are mounted on the conveyor chains 38 and 39 at short intervals, as shown in FIG. 1, e.g., via brackets 62 and 63, which are supported in corresponding eyes of the individual chain links. Attachment bores 64, 65, 66 and 67 are provided on the brackets 62 and 63. Flexible metal strips 68, 69 are fixed to these attachment bores, e.g., by appropriate screw connections. The metal strips 68 and 69 rest directly against the filter media strip 46.

The function of these metal strips will now be explained in greater detail with reference to a detail view shown in FIG. 3.

Figure 3:
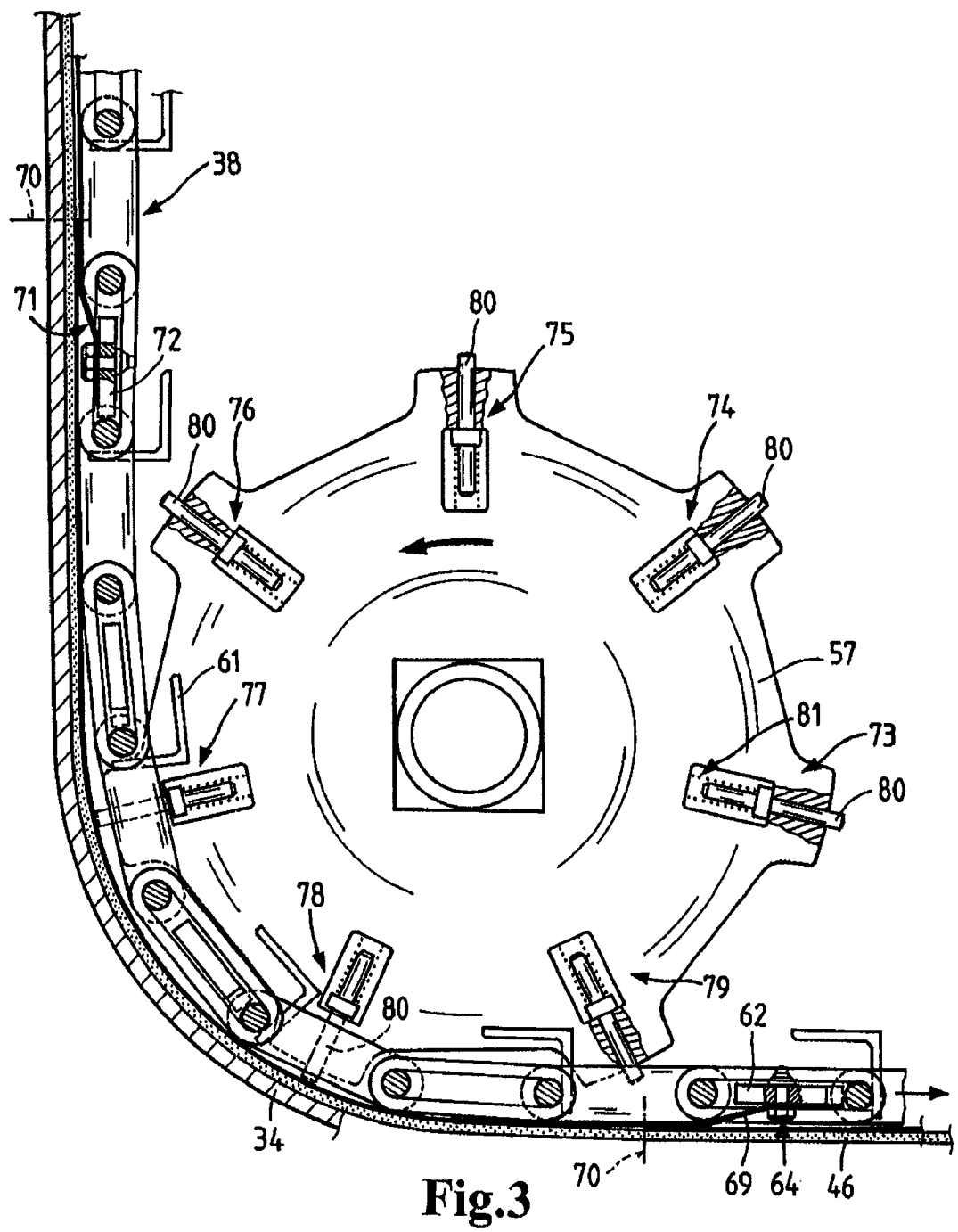
FIG. 3 is a detail view of a gear wheel for the chain transport.

FIG. 3 shows the gear wheel 57 around which the path of the endless chain 38 is deflected in the lower region of the filter apparatus 10. The filter media strip 46, which is carried along or moved by the conveyor chain, rests directly on the partition 34. A metal strip 69 is attached to the bracket 62 by the screw connection 64 shown here. This metal strip 69 extends underneath the chain links and lies directly against the filter media strip 46 and ends in region 70, namely in an area where the next metal strip 71—starting from the next bracket 72—ensures in turn that the filter media strip 46 contacts the partition 34. This means that the individual metal strips slightly overlap one another as viewed in the direction of movement. This is necessary also because minor shifts occur between the metal strips due to the configuration of the transport path and the different curvatures or straight sections traversed by the strips.

To ensure that the metal strip 71 contacts the partition 34 between the chain links so as to provide a reliable seal, hold-down elements 73, 74, 75, 76, 77, 78, 79 are provided on the gear wheel 57. Each of these hold-down elements comprises a longitudinally supported pin 80 disposed in a corresponding bore of the gear wheel 57. A compression spring 81 applies a radially outwardly directed force to each pin, which ultimately has the effect that the hold-down element urges or moves the metal strip in a radially outward direction to hold the filter medium against the partition, as illustrated by the hold-down element 78. The resilient properties ensure that the curvature of the metal strip adapts to the radius of the partition. The movement of the conveyor chain 38, the drivers 61 and the filter media strip 46 is not impeded by the metal strips disposed on the conveyor chain. A detachment of the metal strips during transport of the filter media strip is not necessary. The metal strip, particularly in the critical regions where the path of the filter media strip is deflected in a different direction, ensures that the filter medium remains 46 in tight contact with the partition 34 so that there is a reliable seal between the unfiltered liquid region and the filtered liquid region of the apparatus.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter apparatus for separating particles from a liquid, comprising a tank with a feed inlet, a gravitational settling zone and a filtration zone disposed downstream thereof, wherein the tank is equipped with two transversely spaced-apart, driven, endless chains with transversely extending drivers are provided between the chains, said chains and drivers forming a conveying apparatus driven by gear wheels and a drive motor, and wherein the filter apparatus has a vacuum chamber formed partly by the tank and arranged underneath the filtration zone, and a filter media strip is disposed between an unfiltered liquid region and a filtered liquid region and is moved through the tank along a path which changes direction by conveying apparatus, wherein each chain or each driver has flexible metal strips provided thereon, said strips extending along the chain over a plurality of chain links, each said strip being fixed at one end and partially overlapping with a succeeding strip, said strips exerting a force directed toward the filter media strip which ensures formation of a seal between the filtered liquid region and the unfiltered liquid region in the area where the moving filter media strip changes direction.

2. A filter apparatus according to claim 1, wherein hold-down elements which exert a force on the metal strips in the direction of the filter media strip, are provided on at least one gear wheel driving the chain.

3. A filter apparatus according to claim 2, wherein the hold-down elements comprise pins supported for longitudinal movement in a radial direction, said pins being supported against a contact surface of the gear wheel by a compression spring.

4. A filter apparatus according to claim 1, wherein the metal strips are fixed to a surface of the driver disposed parallel to the direction of movement of the filter media.

5. A filter apparatus according to claim 1, wherein the metal strips have a length of about 80 mm to 150 mm and a width of about 600 mm to 1000 mm.

* * * * *